Patented Dec. 9, 1952

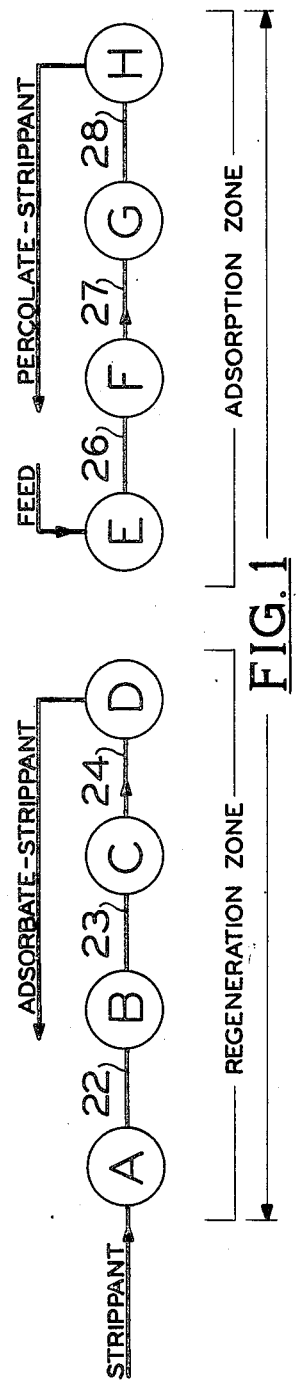
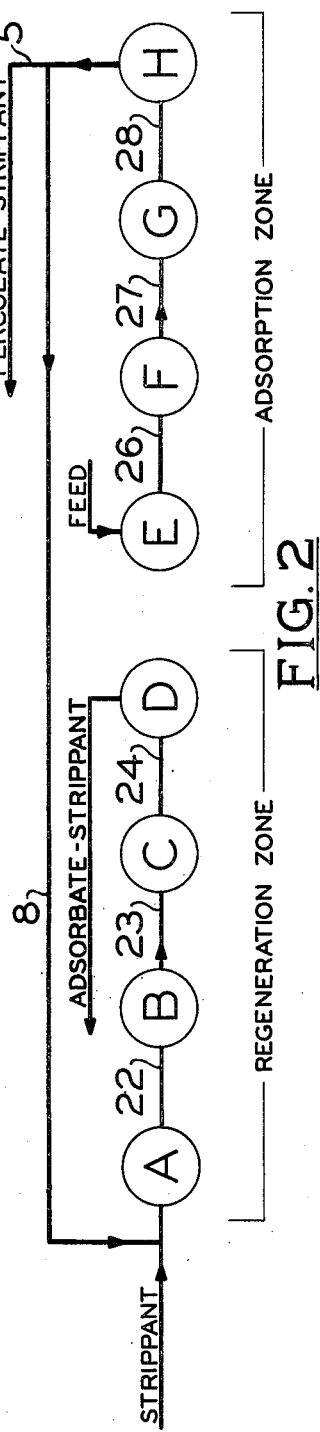
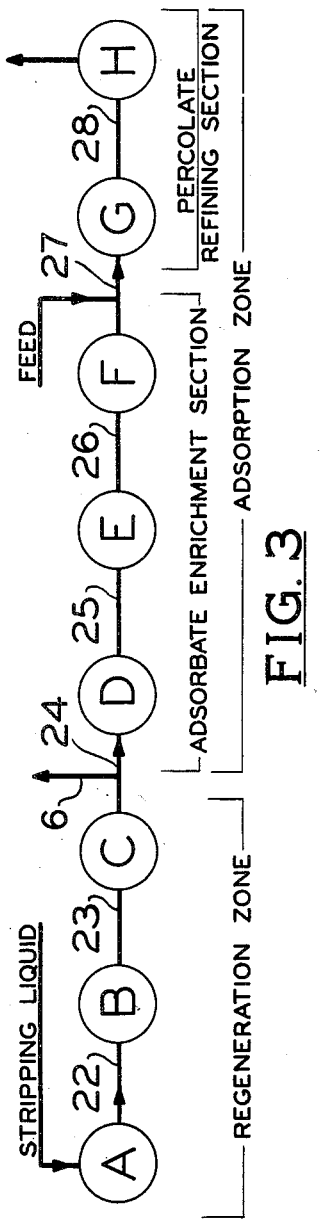

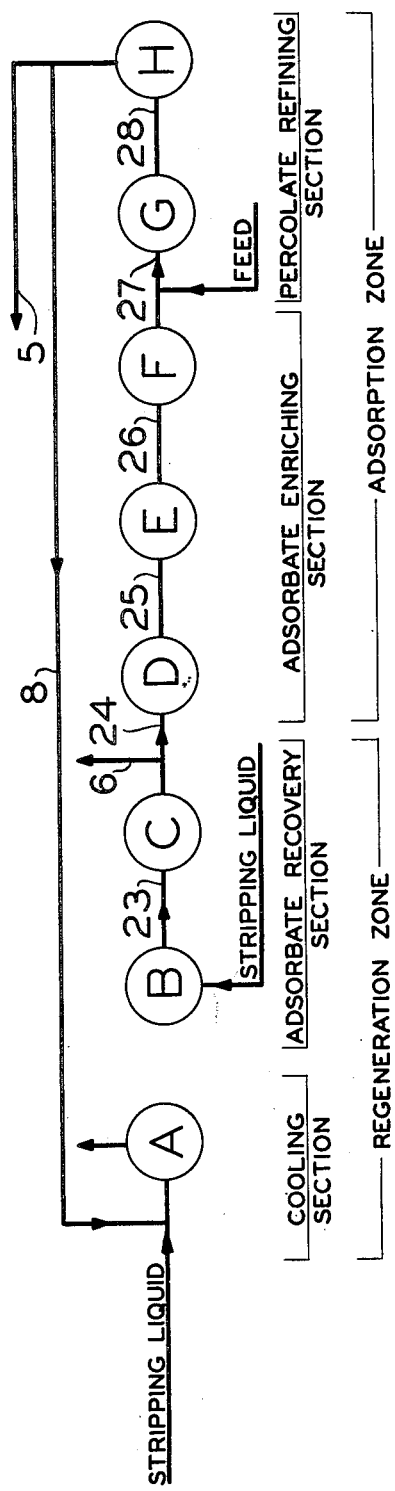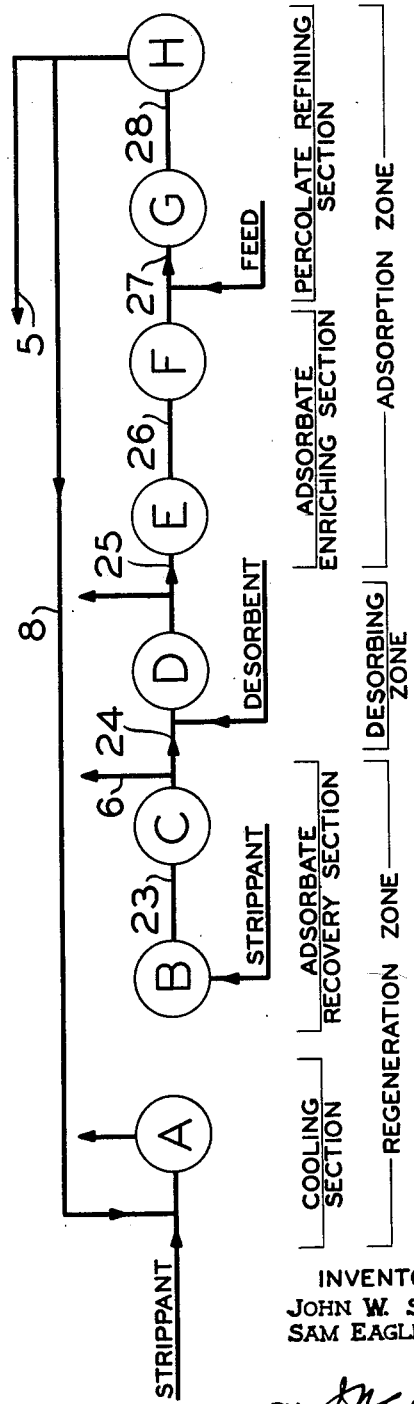

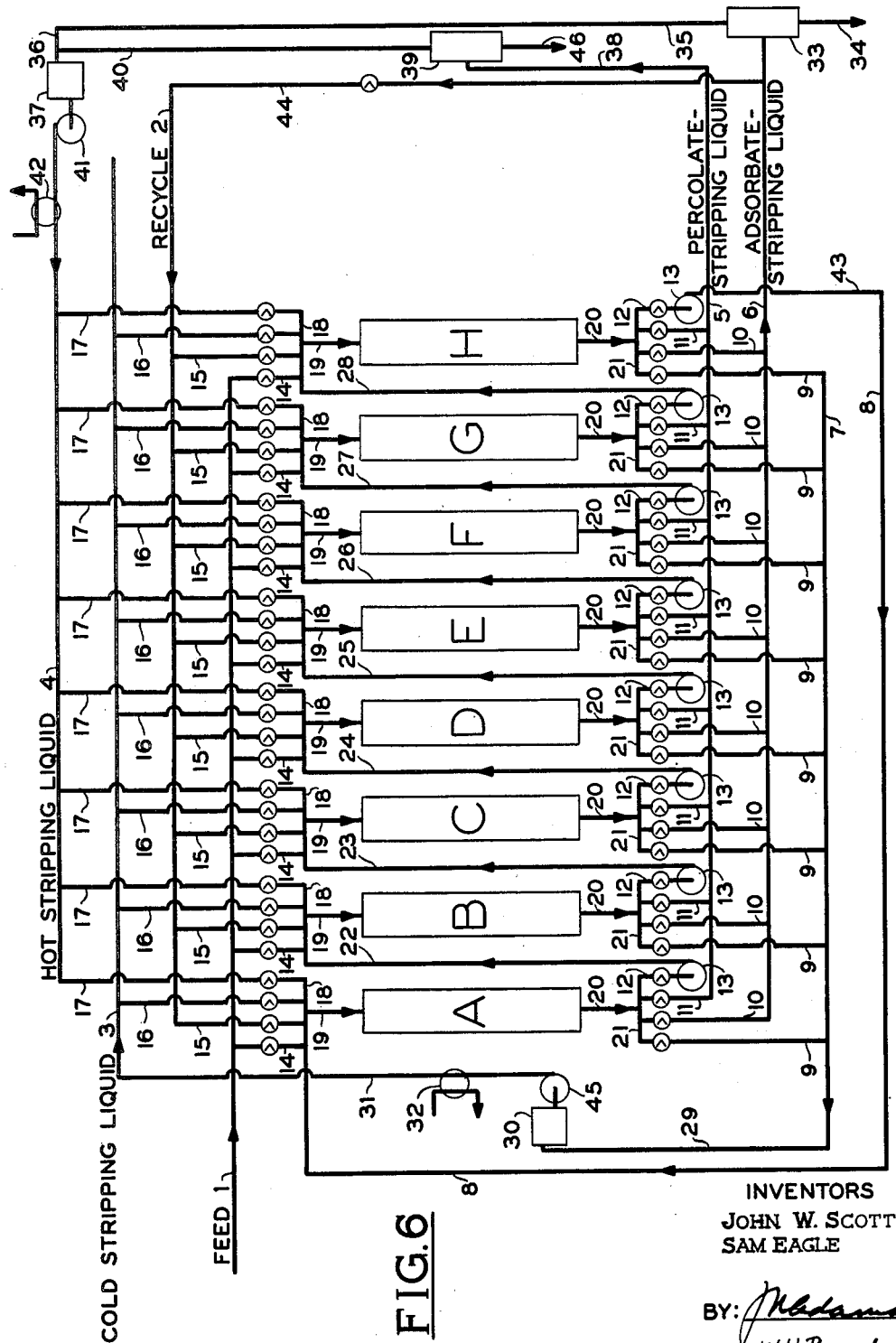

2,621,149

UNITED STATES PATENT OFFICE 2,621,149

ADSORPTION SEPARATION PROCESS

John W. Scott, Berkeley, and Sam Eagle, Richmond, Calif., assignors to California Research Corporation, San Francisco, Calif., a corporation of Delaware Application February 21, 1948, Serial No. 10,166

16 Claims. (Cl. 196—147)

The present invention relates to improvements in liquid phase adsorption separations and more particularly to improvements in a cycle liquid phase adsorption separation process employing multiple fixed adsorbent beds and moving feed and withdrawal points as disclosed in the copending application of Egan and Scott, Serial No. 793,772.

Liquid phase adsorption separations may be conducted employing a fixed adsorbent bed in batch operation, a moving mass of adsorbent in a continuous operation, or a plurality of fixed adsorbent beds in a cyclic operation. In any of these arrangements of the adsorbent a simple separation may be conducted by the steps of alternately contacting the adsorbent with a liquid feed to separate an adsorbate and an effluent percolate and then with a stripping liquid to remove the adsorbate from the adsorbent and to regenerate it for reuse. In the improved method of operating such an adsorption process according to the present invention, either the first effluent from the adsorbent during the feed contacting step, which first effluent consists essentially of stripping liquid resident in the adsorbent mass at the conclusion of its previous regeneration, is recycled into contact with the adsorbent during the stripping liquid contacting step or the first effluent from the adsorbent during the stripping liquid contacting step, which first effluent contains adsorbate, and stripping liquid, and some percolate, is recycled into contact with the adsorbent following the feed contacting step and prior to the stripping liquid contacting step, or both of these first effluents are recycled into contact with the adsorbent at the time and in the manner described. The advantages which attend the employment of these recycle steps hereinafter described are realized in batch, continuous, and cyclic operation. The cyclic operation employing a plurality of fixed adsorbent beds is particularly well adapted to the inclusion of the recycle steps of the present improved process.

In a cyclic liquid phase adsorption separation fixed adsorbent beds are arranged in at least two serially interconnected groups, one of these constituting an adsorption zone and another a regeneration zone. In the adsorption zone a liquid feed is contacted with a solid adsorbent to separate an adsorbate and a non-adsorbed percolate. In the regeneration zone the adsorbate separated in previous cycles is removed from the adsorbent and the adsorbent is regenerated for reuse. In the course of a cycle of operation the capacity of one of the adsorbent beds in the adsorption zone to effect further separation of the feed is exhausted and the regeneration of one of the adsorbent beds in the regeneration zone is completed. In the succeeding cycle of operation the spent adsorbent bed is transferred from the adsorption zone to the regeneration zone and the regenerated adsorbent bed is transferred from the regeneration zone to the adsorption zone. Regeneration is preferably effected by contacting the spent adsorbent with a stripping liquid, that is, with a liquid for which the adsorbent has a lower adsorptive preference than it has for the adsorbate. The practice requires that two secondary separations be made, ordinarily by distillation. First, the effluent of the regeneration zone is distilled to separate the stripping liquid from the material which it has removed from the adsorbent. Second, a regenerated adsorbent bed at the time of its transfer to the adsorption zone in initiating a new cycle of operation is saturated with stripping liquid. When the feed is introduced into the adsorption zone this stripping liquid flows from that zone as well as the percolate. It has been the practice to recover these liquids together and separate them by distillation. Accordingly, secondary separations are an important factor in determining operation and installation costs in any application of the process.

It has now been found that the volume of liquid required to be distilled in secondary separations may be substantially reduced by recycling certain of the process streams as hereinafter described.

Accordingly, it is the object of the present invention to substantially reduce the volume of liquid required to be distilled in secondary recovery separations in a liquid phase adsorption separation process in which a stripping liquid is employed to remove the adsorbate from the adsorbent and to regenerate the adsorbent for reuse. This object is particularly well realized in a cyclic adsorption process of this character where a plurality of fixed adsorbent beds disposed in an adsorption zone and a regeneration zone is employed.

Other and further objects will be made evident in the following detailed description of the process of the invention.

The appended drawings are diagrammatic illustrations of process flow patterns and apparatus suitable for the practice of the invention of which:

Figure 1 illustrates a simple cyclic adsorption separation.

Figures 2 to 5 inclusive illustrate several modifications of the process flow pattern in the process of the invention.

Figure 6 illustrates an arrangement of apparatus suitable for the practice of the invention.

Referring now to Figure 1, the letters A to H inclusive indicate masses of particled solid adsorbent which are substantially equivalent in respect to the quantity and character of adsorbent in each mass. The masses A to D inclusive are serially connected by lines 22, 23 and 24 to constitute a regeneration zone and masses E to H inclusive are serially connected by lines 26, 27 and 28 to constitute an adsorption zone. A liquid feed is introduced into mass E, the first terminal adsorbent mass of the adsorption zone, and the non-adsorbed percolate together with stripping liquid retained by the adsorbent from the regeneration step in the previous cycle of operation is recovered from mass H, the last terminal mass of the adsorption zone. The preferentially adsorbed component of the feed is removed from it by the adsorbent and held as an adsorbate. A concentration gradient of the adsorbate held by the several adsorbent masses of the percolate refining zone is established, this concentration being highest at E and lowest at H, that is, the concentration decreases in the direction of flow within the zone. A stripping liquid, that is, a liquid for which the adsorbent shows a lower adsorptive preference than it shows for the adsorbate, is passed into mass A, the first terminal adsorbent mass of the regeneration zone and acts on the adsorbent to remove from it the adsorbate separated in previous cycles of operation. A concentration gradient of the adsorbate held on the adsorbent is established in the regeneration zone, the concentration being lowest at A and highest at D, that is, the concentration increases in the direction of flow within the zone. A mixture of stripping liquid and adsorbate is recovered from mass D, the last terminal mass of the regeneration zone. The percolate-stripping liquid mixture from mass H and the stripping liquid-adsorbate mixture from mass D are separated usually by distillation, the percolate and adsorbate being retained as process products and the stripping liquid being reused in the process. The indicated flow of liquids is continued until the adsorbent in mass E is exhausted, that is, it has picked up so much adsorbate from the feed that it has no capacity for further separation of the adsorbate from the feed, and until the adsorbent in mass A is regenerated, that is, the stripping liquid has removed substantially all of the previously separated adsorbate from it and it is ready for reuse. Upon the exhaustion of mass E and the regeneration of mass A, a new cycle is initiated by altering the connecting lines so that mass A, the first terminal adsorbent mass of the regeneration zone, becomes the last terminal adsorbent mass of the adsorption zone and so that mass E, the first terminal adsorbent mass of the adsorption zone becomes the last terminal mass of the regeneration zone in the new cycle. The designations, first terminal adsorbent mass and last terminal adsorbent mass, are made in the sense that the flow of liquid within each zone is from the first terminal mass to the last terminal mass. In the new cycle the stripping liquid is introduced into mass B and the stripping liquid-adsorbate mixture is withdrawn from mass E, and feed is introduced into mass F and a percolate-stripping liquid mixture is withdrawn from mass A. The residual feed mixture in mass E at the completion of the first cycle is preferably drained from the mass or displaced into mass F by stripping liquid prior to the initiation of the new cycle.

Operation according to Figure 1 is the simplest form of operation of a cyclic process employing multiple fixed adsorbent beds and moving feed and withdrawal points. Modifications of this simplest flow pattern designed to effect sharper separation are disclosed in the copending application of Egan and Scott, Serial No. 793,772. These modifications include recycle of a portion of the adsorbate product after distillation and the introduction of a desorbing liquid, that is, a liquid more strongly adsorbed than the adsorbate, following the feed and prior to the introduction of stripping liquid. The further modifications which have now been discovered and which produce great economies in process operation will now be described in detail with reference to the particular figures of drawing.

Figure 2 of the appended drawings is a modification of the cyclic adsorption process in which the first effluent of the adsorption zone is conducted via line 8 to mass A for use in the regeneration zone instead of being distilled as in the simple process shown in Figure 1. It has been found that the stripping liquid resident in adsorbent mass H at the conclusion of the preceding cycle is displaced from mass H during the illustrated cycle without appreciable mixing with the non-preferentially adsorbed percolate fraction of the feed and may be directly used in the regeneration zone without distillation. The liquid capacity of an adsorbent mass is the sum of the volume of interstitial space between the adsorbent particles and of the pore volume of the adsorbent. In silica gel of 28–200 mesh size this capacity may amount to about 0.8 cc. of liquid for each gram of silica gel in the mass. In general at least one-half of the liquid capacity of adsorbent mass H may be recycled to the regeneration zone without distillation; in some separations a larger volume, for example a volume equal to the entire liquid capacity, as above defined, of mass H may be recycled to the regeneration zone. In a separation of kerosene having an aromatic content of about 22% employing isooctane as the stripping liquid one-half of the liquid capacity of mass H is recycled and a reduction of 20% in the volume of liquid effluent from the adsorption zone which must be distilled is obtained. In a separation of thermally cracked naphtha employing pentane as the stripping liquid the entire liquid capacity of mass H is recycled and the volume of adsorption zone effluent going to distillation may be reduced by as much as 50%. Following the introduction of the first effluent from the adsorption zone into the regeneration zone via line 8, the subsequent effluent from the adsorption zone during the cycle comprising percolate and stripping liquid passes to distillation via line 5.

In the cycles illustrated in both Figure 1 and Figure 2, mass D at the beginning of the cycle would contain some interstitial, unseparated feed liquid which during the first part of the cycle may be segregated and fed into the adsorption zone in later cycles or passed directly into mass E at the beginning of the illustrated cycle.

Figure 3 of the appended drawings illustrates a modification of the cyclic adsorption process in which the first liquid effluent from the regeneration zone is directly employed to effect a purification of the adsorbate prior to its removal from the adsorbent. Serially connected absorbent masses A, B, and C constitute a regeneration zone and masses D to H inclusive constitute an adsorption zone in which serially connected masses D, E, and F constitute an adsorbate enrichment section and serially connected masses G and H constitute a percolate refining section. The adsorbate enrichment section and the percolate refining section are serially connected to each other by line 27 throughout the illustrated cycle. As indicated above, a modification of the cyclic adsorption process has previously been disclosed in which adsorbate stripped from the adsorbent and separated from the stripping liquid by distillation is recycled into contact with the adsorbent following the contact of the adsorbent with the feed liquid. The purpose of such a recycle is to obtain an adsorbate product of higher purity and an increased yield of percolate. When the adsorbent is fully spent in the adsorption zone an equilibrium condition is attained in which the material adsorbed is of such a composition that further contact with the feed produces no net change in its composition. This adsorbed material at equilibrium contains some of the non-preferentially adsorbed fraction of the feed. If the adsorbent prior to regeneration is contacted with a liquid richer than the feed in the preferentially adsorbable component of the feed, then net adsorption of this componet occurs and net desorption of the nonpreferentially adsorbable component occurs with the overall result that the finally recovered adsorbate may be purified and substantially freed of the non-preferentially adsorbable component. It has now been found that this desired purification may be effected by passing the first effluent of the regeneration zone into contact with the adsorbent which has been exhausted and thus has no further capacity to separate the feed, instead of using adsorbate separated from the adsorbate-stripping liquid mixture by distillation, for this purpose. Thus, the first effluent from adsorbent mass C, the last terminal mass of the regeneration zone, is passed into mass D of the adsorbate enrichment section via line 24. The latter portion of the effluent from mass C is passed to distillation via line 6. When regeneration is effected in the preferred manner with hot stripping liquid the first effluent of the regeneration zone is substantially richer in the preferentially adsorbable component of the feed than is the feed itself. In the separation of kerosene containing about 22 per cent aromatics, utilization of the first effluent of the regeneration zone instead of the preferentially adsorbed component of the feed which has been separated from the stripping liquid by distillation reduced the volume of stripping liquid required to be distilled by more than 30 per cent. The volume of the first effluent of the regeneration zone introduced into the adsorbate enrichment section during a cycle is ordinarily about equal to the liquid capacity of one adsorbent mass. The cycle of operation illustrated in Figure 3 is completed when the adsorbent mass G is exhausted and adsorbent mass A is regenerated. In the succeeding cycle masses H and A are connected to constitute the percolate refining section, masses E, F, and G are connected to constitute the adsorbate enrichment section and masses B, C, and D are connected to constitute the regeneration zone. Further cycles are initialed by similar changes in connections. It is seen that if a total of X adsorbent masses are employed in the process, each mass will occupy the same relative position in the X+1 cycle of operation that it occupies in the first cycle.

Figure 4 of the appended drawings illustrates a preferred method of operation in which the first effluent of the regeneration zone and the first effluent of the adsorption zone are both reintroduced into the system without distillation. In the cycle illustrated in Figure 4 adsorbent masses A to C inclusive constitute the regeneration zone and masses D to H inclusive constitute the adsorption zone. Serially connected adsorbent masses B and C constitute the adsorbate recovery section into which hot stripping liquid is introduced, serially connected masses D, E, and F constitute an adsorbate enriching section, serially connected masses G and H constitute a percolate refining section, and mass A constitutes a cooling section through which cold stripping liquid is passed to cool the regenerated adsorbent of mass A preparatory to its incorporation in the percolate refining section of the adsorption zone in the next succeeding cycle. The adsorbate enriching section and the percolate refining section are connected throughout the cycle. During the first part of the illustrated cycle the effluent of the percolate refining section is passed from mass H via line 8 to mass A and the effluent of the adsorbate recovery section is passed from mass C via line 24 to mass D, the first terminal mass of the adsorbate enriching section. During the latter part of the illustrated cycle the effluents of the percolate refining section and of the adsorbate recovery section are passed to separate distillation via lines 5 and 6, respectively. In the first part of the cycle the first effluent of the percolate refining section may be recycled via line 8 to mass B instead of mass A and similar economy of operation obtained; however, this recycled stream would have to be heated prior to introduction into mass B in preferred operation. Operation in the manner illustrated in Figure 4 makes possible the production of an adsorbate and a percolate of improved quality with large reductions in the volumes of percolate-stripping liquid mixture and adsorbate-stripping liquid mixture which must be distilled per unit volume of product recovered. Successive cycles are initiated by regrouping the adsorbent masses so that mass A, the first terminal adsorbent mass of cooling section if there be more than one mass in the section, mass B, the first terminal mass of the adsorbate recovery section and mass D, the first terminal mass of the adsorbate enriching section become respectively the last terminal masses of the percolate refining section, the cooling section and the adsorbate recovery section, and by moving the points of introduction of feed, of hot stripping liquid, and of cold stripping liquid to the next serially connected adsorbent mass in the percolate refining section, the adsorbate recovery section, and the cooling section respectively.

Figure 5 illustrates a modification of the process of the invention in which a desorbent is employed to remove the adsorbate from the adsorbent and the adsorbent is then regenerated by removing the desorbent from it by means of a stripping liquid. The desorbent is a liquid for which the adsorbent shows an adsorptive preference equal to or greater than that which it shows for the preferentially adsorbed fraction of the feed. The percolate may be advantageously employed as the stripping liquid in many separations where a desorbent is utilized. Operation according to the modification illustrated by Figure 5 is as follows: cold stripping liquid is passed through mass A to cool it for use in the percolate refining zone in the next succeeding cycle. Hot stripping liquid is passed into the adsorbate recovery section comprising masses B and C to remove the desorbent from the adsorbent and regenerate the adsorbent for reuse. The effluent of the regeneration zone is passed into the desorbing zone comprising mass D via line 24 in the first part of the cycle and to distillation via line 6 in the latter part of the cycle. Feed is passed into the percolate refining section comprising masses G and H and the effluent from this section is passed into the cooling section via line 6 during the first part of the cycle and to distillation via line 5 during the latter part of the cycle. The effluent of the desorbing zone is passed into the adsorbate enriching section comprising masses E and F via line 25 during the first part of the cycle and to distillation during the latter part of the cycle. Succeeding cycles of operation are initiated by regrouping the adsorbent masses in a manner similar to that described in reference to Figure 4. In the next succeeding cycle of operation mass B would constitute the cooling section, masses C and D the adsorbate recovery section, mass E the desorbing zone, masses F and G the adsorbate enriching section and masses H and A the percolate refining section. When a liquid other than the percolate is used as the stripping liquid three distillations are necessary in the process, one to separate stripping liquid-desorbent mixture effluent from the regeneration zone, one to separate adsorbent-desorbent mixture effluent from the desorbing zone, and one to separate percolate-stripping liquid mixture effluent from the percolate refining section. If the percolate is employed as the stripping liquid in the process, and this is the preferred practice and is followed unless the percolate has properties which render its use in this manner undesirable as where it is a liquid of low diffusivity or where it tends to polymerize when heated in contact with the adsorbent, then the step of separating a percolate-stripping liquid mixture disappears and only two distillations are required. In this latter case the quantity of desorbent introduced into mass D must be sufficient to displace substantially all of the adsorbate held by the adsorbent of mass D.

Figure 6 of the drawings shows an arrangement of apparatus suitable for the practice of the invention. The letters A to H inclusive represent uniform adsorption columns charged with a solid adsorbent. Each column has an inlet manifold line 18 connected to the column by a line 19 and an outlet manifold line 21 connected to the column by a line 20. Line 1 is a feed manifold. Line 2 is recycle manifold line to recycle the effluent of the regeneration zone to the enrichment zone, line 3 is a cold stripping liquid manifold line and line 4 is a hot stripping liquid manifold line. Line 1 is connected to the inlet manifold 18 at each column by valved line 14, valved lines 15, 16 and 17 connect lines 2, 3 and 4 respectively to the inlet manifold 18 at each column. Line 5 is is a manifold line for conducting the percolate-stripping liquid mixture via line 38 to still 39, line 6 is a manifold line for conducting the adsorbate-stripping liquid mixture to recycle line 2 via valved line 44 or to still 33, line 7 is a manifold line for conducting the first effluent of the percolate refining zone comprising stripping liquid to stripping liquid storage tank 30 via line 29. Lines 22 to 28 inclusive and lines 43 and 8 are connecting lines between the columns. Valved lines 9, 10 and 11 connect the outlet manifold 21 at each column to lines 7, 6 and 5 respectively. Valved line 12 at each column connects outlet manifold 21 to pump 13 which forces the liquid entering it into the next column through the appropriate column connecting line.

Pump 45 forces cold stripping liquid from storage tank 30 through heat exchanger 32 and via line 31 to manifold line 3. Percolate product is recovered from still 39 via line 46, the stripping liquid separated by still 39 is passed to hot stripping liquid storage tank 37 via line 40. Adsorbate product is removed from still 33 via line 34. Stripping liquid separated by still 33 is passed to hot stripping liquid storage tank 37 via lines 35 and 36. Pump 41 forces hot stripping liquid from tank 37 through heat exchanger 42 into manifold line 4. If a desorbing liquid is used in the process a third still will be required unless the percolate is used as the stripping liquid and a desorbent manifold line paralleling lines 1, 2, 3 and 4 with appropriate connections to inlet manifolds 18 will be added. The valve settings required to produce the flow patterns shown in the drawings will be apparent to those skilled in the art. For example, the flow pattern of Figure 4 is produced with the following valve setting: In the first part of the cycle at column A valve lines 16 and 9 are open. At column B valved lines 17 and 12 are open. At columns C, D, E and F valved lines 12 are open. At column G valved lines 14 and 12 are open. At column H valved line 12 is open. All other valves are closed. In the latter part of the cycle at column C valved line 12 is closed and valved line 10 is opened and at column H valved line 12 is closed and valved line 11 is opened, all other settings remain the same as in the first part of the cycle.

In connection with the foregoing descriptions of the process flow patterns illustrated by the several figures of the drawing, it should be understood that the total number of adsorbent masses employed, and the number employed in each zone and in each section of each zone, may be greater or smaller than the number illustrated. The actual number employed is determined by the character of the feed, the desired product quality and economic considerations in construction.

EXAMPLE I

A series of runs were made to obtain comparison data with respect to distillation load without recycle, with recycle of the first effluent of the adsorption zone as shown in Figure 2, with recycle of the first effluent of the regeneration zone as shown in Figure 3 and with recycle of the first effluent of both zones as shown in Figure 4. The feed in each of the runs was a kerosene distillate having the following properties: API gravity 39.9, aniline point 132° F., sulfur 0.053%, aromatic content 22.5% by ASTM D875–46T, viscosity 100° F. CS 156, cetane number 42.5, and an ASTM D–86 distillation showing start, 370° F.; 10%, 380° F.; 50%, 414° F.; 90%, 472° F.; and end point 501° F. The stripping liquid employed was iso-octane. In order to compare the distillation loads inherent in each type of operation the conditions in all runs were adjusted to realize substantially identical liquid velocities, production rates, and yield and quality of product. This equivalency in operating conditions was achieved by varying the ratio of the volumes of process liquid charged to the mass of adsorbent employed. The apparatus employed was substantially the same as that shown in Figure 6. Eight columns of 0.172 ft. in internal diameter and 10 ft. in length were packed with 28–200 mesh silica gel having a bulk density of 0.67 g./cc. The void or interstitial volume plus the pore volume of the gel amounted to 70 per cent of the empty volume of the column. The following Table I summarizes the results.

the regeneration zone is recycled into the stabilized adsorbate.

The catalytically reformed gasoline feed had an API gravity of 50.9, an aniline point of 68.5, a bromine number of 3, an aromatic content of 35.8% by ASTM D875–46T. An ASTM D–86 distillation showed, start, 134° F.; 10%, 206° F.; 50%, 242° F.; 90%, 269° F.; and end point, 310° F.

*Table I*

|  | No recycle—Operation, Figure 1 | Refining zone Operation, recycle—Figure 2 | Regeneration zone recycle—Operation, Figure 3 | Regeneration zone and refining zone recycle—Operation, Figure 4 |
|---|---|---|---|---|
| Percolate: |  |  |  |  |
| Yield | 77% of feed | 77% of feed | 77% of feed | 77% of feed. |
| Quality | 1% aromatic | 1% aromatic | 1% aromatic | 1% aromatic. |
| Adsorbate: |  |  |  |  |
| Yield | 23% of feed | 23% of feed | 23% of feed | 23% of feed. |
| Quality | 95% aromatic | 95% aromatic | 95% aromatic | 95% aromatic. |
| Fluid quantities feed | 1.0 gal | 1.0 gal | 1.0 gal | 1.0 gal. |
| Stripping liquid | 3.90 gal | 3.90 gal | 2.38 gal | 2.38 gal. |
| Refining section recycle | None | 1.08 | None | 0.66. |
| Regeneration zone recycle | do | None | 1.14 | 1.14. |
| Net stripping liquid to stills | 3.90 | 2.82 | 2.38 | 1.72. |
| Total liquid to stills | 4.90 | 3.82 | 3.38 | 2.72. |
| Stripping liquid distilled per gallon of percolate | 5.07 | 3.67 | 3.09 | 2.23. |
| Stripping liquid distilled per gallon of adsorbate | 17.0 | 12.3 | 10.3 | 7.47. |

It is seen from Table I that recycle of the first effluent of the percolate refining zone amounting to 0.66 gallon when employing the flow pattern of Figure 4 reduces the volume of stripping liquid being distilled by 0.66 gallon. Expressed in per cent, the volume of stripping liquid distilled is reduced by about 28 per cent when operating according to Figure 4 rather than Figure 3. It is also seen from Table I that recycle of the first effluent of the regeneration zone amounting to 1.14 gallons results in a decreased stripping liquid requirement for the same degree of separation and the same quality product. The reduction in the volume of stripping liquid required to be distilled realized by this recycle step amounts to about 39 per cent. When the process is conducted according to the flow pattern of Figure 4, recycling 0.66 gallon of the first effluent of the percolate refining section and 1.14 gallons of the first effluent of the regeneration zone, the net volume of stripping liquid required to be distilled is reduced by about 56 per cent from the volume distilled where no recycle is employed. Recycle of the first effluent from the percolate refining section of the adsorption zone to the regeneration zone has the effect of introducing the last traces of aromatics which are present in mass H at the conclusion of its regeneration during the preceding cycle into the regeneration zone rather than into the percolate still where such aromatics would contaminate the percolate product. These figures illustrate the significant economies in respect to the volume of liquid required to be distilled in secondary recovery separations and consequently in the installation and operating costs of secondary separation which may be obtained by the improved process of this invention.

EXAMPLE II

Two runs were made to separate a catalytically reformed gasoline into an aromatic adsorbate and a non-aromatic percolate. As has been pointed out, the recycle of adsorbate separated by distillation from the effluent of the regeneration zone to the adsorbate enriching section has been employed to improve the quality of the product adsorbate and the yield of percolate. In one of the runs of this example, this adsorbate recycle is employed and in the other the first effluent of the adsorbate enriching section instead of the having the following properties, API gravity 45.8; aniline point 163; aromatics less than 0.1% by ultra violet analysis; viscosity at 210° F. 0.81 CS. An ASTM D–86 distillation showed, start, 387° F.; 10%, 400° F.; 50%, 416° F.; 90%, 445° F.; and end point, 466° F.

The apparatus employed was substantially the same as that of Figure 6. Eight columns of 0.172 ft. internal diameter and 10 ft. in length were packed with 28–200 mesh silica gel. The gel had a bulk density of 0.70 g./cc. and a pore volume of 0.38 cc./gm. The void or interstitial space plus the pore volume of the gel, that is, the liquid capacity of each column, amounted to 67 per cent of the volume of the empty column. Two columns were in the percolate refining section, two in the adsorbate enriching section, and four were in the regeneration zone. The percolate refining section was at 70–100° F. and stripping liquid was passed into the regeneration zone at 220° F. The following Table II shows the results of the runs; in column 1, data for results obtained when recycling adsorbate recovered by distillation from the effluent of the regeneration zone are recorded, and in column 2, results obtained when recycling the first effluent of the regeneration zone are recorded.

*Table II*

|  | (1) Recycle of previously separated adsorbate | (2) Recycle of first effluent of regeneration zone |
|---|---|---|
| Percolate: |  |  |
| Yield | 63% of feed | 63% of feed. |
| Quality | 5% aromatic | 4% aromatic. |
| Adsorbate: |  |  |
| Yield | 37% of feed | 37% of feed. |
| Quality | 88% aromatic 5—bromine number | 91% aromatic. Bromine number less than 1. |
| Fluid quantities/cycle feed | 0.528 gal | 0.528 gal. |
| Stripping liquid | 3.70 gal | 2.91 gal. |
| Refining zone recycle | 0.80 gal | 0.80 gal. |
| Regeneration zone recycle | None | 1.19 gal. |
| Separated adsorbate recycle | 1.06 gal | None. |
| Total liquid to stills | 4.49 gal | 2.64 gal. |
| Gal. distilled/gal. feed | 8.5 | 5.0. |

It is seen from Table II that the separation obtained when recycling the first effluent of the regeneration zone is better than that obtained when recycling stabilized adsorbate; and further, that this improved separation is obtained with the distillation of only 5.0 gallons of liquid per gallon of feed as opposed to 8.5 gallons per gallon of feed when recycling stabilized adsorbate, the reduction is about 41 per cent.

EXAMPLE III

A dehexanized thermally cracked naphtha derived from a California crude oil was separated into an aromatic adsorbate and a non-aromatic percolate employing the flow pattern illustrated by Figure 3. The adsorption columns and adsorbent were the same as in Example I above. The cracked naphtha had an API gravity of 50, aniline point 96, bromine number 71 and an ASTM D-86 distillation range of 214° F. start to 427° F. end point. Two runs were made recycling different volumes of the first effluent of the regeneration zone. Pentane at 200° F. was employed as the stripping liquid. The following Table III summarizes the results obtained.

*Table III*

|  | Run 1 | Run 2 |
|---|---|---|
| Percolate: |  |  |
| Yield | 55% | 77%. |
| Quality | <1% aromatics | <1% aromatics. |
| Adsorbate: |  |  |
| Yield | 45% | 23%. |
| Quality | +40 aniline point | −30 aniline point. |
| Fluid quantities/cycle feed | 3,500 cc | 3,500 cc. |
| Stripping liquid | 12,000 cc | 12,000 cc. |
| Regeneration zone recycle | 3,500 cc | 4,500 cc. |
| Total liquid to stills | 19,000 cc | 20,000 cc. |
| Vol. distilled/vol. feed | 5.4 | 5.7. |
| Vol. distilled/vol. percolate product. | 10 | 7.4. |

The liquid capacity of the adsorbent columns, that is, the volume of the interstitial space between the adsorbent particles plus the pore volume of the adsorbent was about 4400 cc. at room temperature. The data of Table III shows that when the recycle volume was 4500 cc., that is, slightly greater than the liquid capacity of a column, the yield of percolate and the quality of the adsorbate were both markedly superior to those obtained when employing a recycle of 3500 cc. or about 0.8 of a column volume. Accordingly, the volume of the first effluent of the regeneration zone which is recycled is preferably about equal to the liquid capacity of one adsorbent mass. It should be noted that in the runs summarized in Table III about 4000 cc. of the first effluent of the adsorption zone consisting predominantly of pentane could have been recycled into the regeneration zone with a corresponding large reduction in the total liquid distilled per cycle.

Two further advantages are obtained in the operation of an adsorption separation process to include the above-described recycle streams. Recycle of the first effluent of the regeneration zone to the adsorption zone instead of recycling pure adsorbate is observed to result in a marked decrease in the fining of the adsorbent in successive cycles of operation. Break-up of the adsorbent particles into fine fragments with resulting increases in pressure drop through the adsorbent bed is increased by bringing the adsorbent into contact with strongly adsorbed material in high concentration. The first effluent of the regeneration zone is less damaging to the adsorbent in this respect than is pure adsorbate separated from this effluent by distillation. Passage of hot stripping liquid from the stills to a hot strippant storage tank and recycle of cold stripping liquid from the adsorption zone to the cooling section as illustrated in Figure 4 tend to reduce the heat requirements of the process.

The improved process of this invention may be applied to any working liquid phase adsorption separation without any limitation as to the feed liquid or adsorbent employed.

However, the preferred feeds are petroleum fractions and the preferred adsorbent is silica gel. Reduction in the volume of liquid required to be distilled in secondary recovery separations is obtained with kerosene distillates, cracked and straight run naphthas, catalytically reformed naphthas, lubricating oils diluted to reduce viscosity, diesel fuel distillates and Fischer-Tropsch and OXO synthesis products.

The stripping liquid employed is a liquid less strongly adsorbed than the adsorbate fraction of the feed and is preferably an aliphatic hydrocarbon or a mixture of aliphatic hydrocarbons when a silica or silica alumina adsorbent is used in separating petroleum distillates. The stripping liquid should boil in such a range that it is readily separable from the feed fractions by distillation. The boiling range of the stripping liquid may thus be either higher or lower than that of the feed. During the stripping step the stripping liquid is hot, being preferably at 200-300° F. Higher temperatures may be employed where the character of the charge undergoing separation and maintenance of liquid phase present no unusual difficulties.

The desorbing liquid employed is a liquid as strongly or more strongly adsorbed than the adsorbate and is ordinarily an aromatic hydrocarbon or an oxygenated organic compound where a silica or silica alumina adsorbent is employed. The desorbing liquid should be separable from the feed fractions and from the stripping liquid by distillation.

The principle and preferred embodiments of the invention have been set forth in the foregoing description and examples; however, it is to be understood that various modifications of the process flow patterns may be made which fall within the scope of the invention as claimed.

We claim:

1. In an adsorption separation process wherein a solid adsorbent mass is alternately contacted with a liquid feed amenable to separation by selective adsorption to separate an adsorbate and a percolate and with a stripping liquid to remove the adsorbate from the adsorbent and regenerate the adsorbent for reuse, the improved method which comprises recycling the first effluent from the adsorbent produced during the stripping liquid contacting step, which first effluent consists predominantly of adsorbate and stripping liquid and which contains some percolate, into contact with the adsorbent following the feed contacting step and prior to the stripping liquid contacting step.

2. The method as defined in claim 1, wherein the liquid feed is a petroleum distillate.

3. The method as defined in claim 1, wherein the liquid feed is a kerosene distillate.

4. The method as defined in claim 1, wherein the liquid feed is catalytically reformed gasoline.

5. The method as defined in claim 1, wherein the liquid feed is cracked naphtha.

6. In an adsorption separation process wherein a solid adsorbent mass is alternately contacted with a liquid feed amenable to separation by selective adsorption to separate an adsorbate and a percolate and with a stripping liquid to remove the adsorbate from the adsorbent and regenerate the adsorbent for reuse, the improved method which comprises recycling the first effluent from the adsorbent produced during the feed contacting step, which first effluent consists essentially of stripping liquid, into contact with the adsorbent during the stripping liquid contacting step and recycling the first effluent from the adsorbent during the stripping liquid contacting step, which first effluent consists predominantly of adsorbate and stripping liquid and which contains some percolate, into contact with the adsorbent following the feed contacting step and prior to the stripping liquid contacting step.

7. In a cyclic adsorption separation process wherein a plurality of fixed adsorbent beds are disposed in serially interconnected groups, comprising a group constituting an adsorption zone and a group constituting a regeneration zone, wherein a liquid feed amenable to separation by selective adsorption is passed into the adsorption zone to separate an adsorbate and an effluent percolate and wherein a stripping liquid is passed into the regeneration zone to remove previously separated adsorbate from the adsorbent and regenerate the adsorbent for reuse, the improved method which comprises recycling the first effluend from the adsorption zone during each cycle, which first effluent consists essentially of stripping liquid, into contact with the adsorbent in the regeneration zone, and recycling the first effluent from the regeneration zone during each cycle, which first effluent consists predominantly of adsorbate and stripping liquid and which contains some percolate, into contact with the adsorbent in the adsorption zone.

8. The method as defined in claim 7, wherein the liquid feed is a petroleum distillate.

9. The method as defined in claim 7, wherein the liquid feed is a kerosene distillate.

10. The method as defined in claim 7, wherein the liquid feed is catalytically reformed gasoline.

11. The method as defined in claim 7, wherein the liquid feed is cracked naphtha.

12. In a cyclic adsorption separation process wherein a plurality of solid adsorbent masses are disposed in serially interconnected groups comprising a group constituting an adsorption zone, a group constituting a desorption zone and a group constituting a regeneration zone, wherein a liquid feed amenable to separation by selective adsorption is passed into the adsorption zone to separate an adsorbate and an effluent percolate, a desorbing liquid is passed into the desorption zone to desorb the adsorbate previously separated, and wherein a stripping liquid is passed into the regeneration zone to remove the desorbing liquid from the adsorbent and regenerate the adsorbent for reuse, the improved method which comprises recycling the first effluent of the regeneration zone during each cycle, which first effluent consists essentially of stripping liquid and desorbing liquid into contact with the adsorbent in the desorbing zone and recycling the first effluent of the desorbing zone during each cycle into contact with the adsorbent in the adsorption zone.

13. The process as defined in claim 12 wherein the stripping liquid is the percolate fraction of the feed liquid.

14. In a cyclic adsorption separation process wherein a plurality of uniform solid adsorbent masses are disposed in serially interconnected groups comprising a group constituting an adsorption zone and a group constituting a regeneration zone, wherein a liquid feed amenable to separation by selective adsorption is passed into the adsorption zone to separate an adsorbate and an effluent percolate and wherein a stripping liquid is passed into the regeneration zone to remove previously separated adsorbate from the adsorbent and regenerate the adsorbent for reuse, the improved method which comprises recycling the first effluent from the regeneration zone during each cycle, which first effluent consists predominantly of adsorbate and stripping liquid and which contains some percolate, into contact with the adsorbent in the adsorption zone, the volume of said first effluent recycled being about equal to the liquid capacity of one adsorbent mass.

15. In an adsorption separation process wherein a liquid feed amenable to separation by selective adsorption is separated by contact with a solid adsorbent into an adsorbate and a percolate and the solid adsorbent is thereafter contacted with a stripping liquid to remove the adsorbate from the adsorbent and regenerate the adsorbent for reuse, the improved cyclic method which comprises maintaining a group of serialy interconnected solid adsorbent masses constituting a regeneration zone and a group of serially interconnected solid adsorbent masses constituting an adsorption zone, passing a stripping liquid into the first terminal adsorbent mass of the regeneration zone during each cycle to remove from the adsorbent therein adsorbate separated in previous cycles of operation and recovering from the last terminal mass of the regeneration zone an effluent comprising stripping liquid and adsorbate, passing a liquid feed into an intermediate adsorbent mass of the adsorption zone and recovering from the last terminal mass of the adsorption zone an effluent comprising percolate, passing the first effluent from the regeneration zone during each cycle into the first terminal adsorbent mass of the adsorption zone and initiating successive cycles by moving the points of liquid introduction in each of said zones to the next serially connected adsorbent mass in the direction of flow and regrouping the adsorbent masses so that the first terminal adsorbent masses in the regeneration zone and adsorption zone during one cycle become the last terminal adsorbent masses in the adsorption zone and regeneration zone respectively in the succeeding cycle.

16. In an adsorption separation process wherein a liquid feed amenable to separation by selective adsorption is separated by contact with a solid adsorbent into an adsorbate and a percolate and the solid adsorbent is thereafter contacted with a stripping liquid to remove the adsorbate from the adsorbent and regenerate the adsorbent for reuse, the improved cyclic method which comprises maintaining a first group of serially interconnected solid adsorbent masses constituting a regeneration zone, maintaining a second group of serially interconnected solid adsorbent masses constituting an adsorbate enrichment section of an adsorption zone, maintaining a third group of serially interconnected solid adsorbent masses constituting a percolate refining section of the adsorption zone, the last terminal adsorbent mass of the adsorbate enrichment section being connected to the first terminal adsorbent mass of the percolate refining section, passing a stripping liquid into the first terminal adsorbent mass of the regeneration zone to remove from the adsorbent the adsorbate separated in previous cycles of operation, passing the liquid feed into the first terminal adsorbent mass of the percolate refining section of the adsorption zone, passing a substantial portion of the first effluent from the regeneration zone and the adsorption zone during each cycle into the adsorbate enrichment section of the adsorption zone and into the regeneration zone respectively, separately recovering the remainder of said effluents during each cycle, and initiating successive cycles of operation by regrouping the adsorbent masses and moving the points of liquid introduction and withdrawal in such manner that the first terminal adsorbent masses of the regeneration zone, the adsorbate enrichment section of the adsorption zone and the percolate refining section of the adsorption zone in one cycle become the last terminal adsorbent masses of the percolate refining section of the adsorption zone, the regeneration zone, and the adsorbate enrichment section of the adsorption zone respectively in the succeeding cycle of operation.

JOHN W. SCOTT.
SAM EAGLE.

REFERENCES CITED

The following references are of record in the file of this patent:

UNITED STATES PATENTS

| Number | Name | Date |
|---|---|---|
| 2,395,491 | Mavity | Feb. 26, 1946 |
| 2,398,101 | Lipkin | Apr. 9, 1946 |
| 2,415,315 | Walter et al. | Feb. 4, 1947 |
| 2,441,572 | Hirschler et al. | May 18, 1948 |
| 2,449,402 | Lipkin et al. | Sept. 14, 1948 |

FOREIGN PATENTS

| Number | Country | Date |
|---|---|---|
| 109,077 | Great Britain | Feb. 4, 1947 |